(12) United States Patent
Gauvin

(10) Patent No.: US 9,081,938 B1
(45) Date of Patent: Jul. 14, 2015

(54) SYSTEMS AND METHODS FOR DETERMINING WHETHER PROFILES ASSOCIATED WITH SOCIAL-NETWORKING WEBSITES HAVE BEEN COMPROMISED

(75) Inventor: William Gauvin, Leominster, MA (US)

(73) Assignee: Symantec COrporation, Mountain View, CA (US)

( * ) Notice: Subject to any disclaimer, the term of this patent is extended or adjusted under 35 U.S.C. 154(b) by 436 days.

(21) Appl. No.: 13/021,862

(22) Filed: Feb. 7, 2011

(51) Int. Cl.
*G06F 12/16* (2006.01)
*G06F 21/10* (2013.01)
*H04L 29/06* (2006.01)

(52) U.S. Cl.
CPC ............. *G06F 21/10* (2013.01); *H04L 63/10* (2013.01)

(58) Field of Classification Search
CPC ........... G06F 17/30766; G06F 21/10; G06F 2221/2113; G06F 21/00; G06F 21/50; G06F 21/60; G06F 21/30; G06F 21/31; G06F 21/62; H04L 67/306; H04L 51/32; H04L 63/102; H04L 63/10; H04L 63/12; H04L 63/16; G06Q 50/01
USPC .................. 711/216; 707/747; 709/229, 225
See application file for complete search history.

(56) References Cited

U.S. PATENT DOCUMENTS

| | | | |
|---|---|---|---|
| 2005/0246282 A1* | 11/2005 | Naslund et al. | 705/52 |
| 2006/0059561 A1* | 3/2006 | Ronning et al. | 726/26 |
| 2008/0022003 A1* | 1/2008 | Alve | 709/229 |
| 2008/0184033 A1* | 7/2008 | Daniels et al. | 713/175 |
| 2009/0138486 A1* | 5/2009 | Hydrie et al. | 707/10 |
| 2010/0100950 A1* | 4/2010 | Roberts | 726/7 |
| 2011/0078287 A1* | 3/2011 | Pacella et al. | 709/219 |
| 2011/0184791 A1* | 7/2011 | Wang | 705/14.7 |
| 2012/0084323 A1* | 4/2012 | Epshtein et al. | 707/776 |
| 2013/0054803 A1* | 2/2013 | Shepard et al. | 709/225 |

* cited by examiner

*Primary Examiner* — Farid Homayounmehr
*Assistant Examiner* — Lizbeth Torres-Diaz
(74) *Attorney, Agent, or Firm* — ALG Intellectual Property, LLC

(57) ABSTRACT

A computer-implemented method for determining whether profiles associated with social-networking websites have been compromised may include (1) creating a database of validated-content identifiers that identify valid content published on a social-networking profile, (2) determining, by monitoring the social-networking profile, that at least one item of content has been illegitimately published on the social-networking profile, and then (3) performing at least one security action on the social-networking profile. Various other systems, methods, and computer-readable media are also disclosed.

19 Claims, 6 Drawing Sheets

```
Publication Request
       400
---------------------------------------------------------------
***********************************************
Social-networking website: http://www.facebook.com
Social-networking profile: http://www.facebook.com/megashoe
Content: "Check out MegaShoe's newest shoe models at http://www.megashoe.com/
newreleases"
Timestamp: 2-1-2011 T 10:45 UTC
***********************************************
---------------------------------------------------------------
```

```
Database Entry for Social-Networking Profile 124(1)
                        402
---------------------------------------------------------------
***********************************************
Social-networking profile: http://www.facebook.com/megashoe
***********************************************
Content Hashes:
0xA2F1B921
0x1738F12A
0xD128B379
0xEF9A0349
***********************************************
---------------------------------------------------------------
```

*FIG. 4*

SYSTEMS AND METHODS FOR DETERMINING WHETHER PROFILES ASSOCIATED WITH SOCIAL-NETWORKING WEBSITES HAVE BEEN COMPROMISED

BACKGROUND

In recent years, the popularity of social-networking websites (such as FACEBOOK and LINKEDIN) has dramatically increased among Internet users. Some social-networking websites allow users to create personal profiles that enable users to stay in touch with one another. Social-networking websites may also allow businesses to create commercial profiles in order to advertise to users of such websites. Unfortunately, some users of social-networking websites may incorrectly presume that social-networking profiles (particularly commercial profiles) are immune to or protected against malicious attacks, potentially giving such users a false sense of security when browsing these profiles. Unfortunately, social-networking profiles, including commercial profiles, may not be completely secure.

For example, a malicious programmer may gain illegitimate access to a commercial FACEBOOK profile (by, e.g., using a man-in-the-middle attack or exploiting a security vulnerability in a social-networking API) and then publish a malicious link on the commercial profile. In this example, the malicious link may appear to have been published by the business associated with the commercial profile. Since the malicious link may appear to have been published by the business, a credulous FACEBOOK user may naively click on the malicious link posted by the malicious programmer without considering the security implications of this act.

As such, the instant disclosure identifies a need for systems and methods for determining whether social-networking profiles have been compromised in order to minimize the amount of harm caused by malicious attacks directed at social-networking profiles.

SUMMARY

As will be described in greater detail below, the instant disclosure generally relates to systems and methods for determining whether profiles associated with social-networking websites have been compromised. In some examples, the systems described herein may accomplish such a goal by (1) creating a database of validated-content identifiers (e.g., content hashes) that identify valid content published on a social-networking profile by authorized users or devices, (2) determining, by monitoring the social-networking profile, that at least one item of content has been illegitimately published on the social-networking profile (by, e.g., determining that at least one item of content published on the social-networking profile lacks a corresponding validated-content identifier within the database), and then (3) performing at least one security action on the social-networking profile (by, e.g., deleting or removing the illegitimately published content).

In one example, the systems described herein may generate the database of validated-content identifiers by (1) identifying requests from authorized client devices to publish content on the social-networking profile in question, (2) generating a validated-content identifier (such as a hash) for each item of content published by such authorized client devices, and then (3) storing each such validated-content identifier within a database entry associated with the social-networking profile in question.

In some examples, the systems described herein may monitor the social-networking profile by periodically scanning content published on the social-networking profile (using, e.g., various screen-scrapping and/or web-scrapping techniques) to determine whether any of the content has been illegitimately published. In these examples, the systems described herein may determine that an item of content has been illegitimately published by (1) generating a hash of the item of content, (2) comparing the hash of the item of content with the hashes stored within a database entry associated with the profile, and then (3) determining, based on the comparison, that the hash of the item of content does not correspond to any of the hashes stored within the database entry associated with the profile.

If an illegitimately published item of content is discovered, then the systems described herein may remove the illegitimately published item of content from the social-networking profile, reset the login information required to access the social-networking profile, and/or notify an owner of the social-networking profile of the illegitimately published item of content. The systems described herein may also notify a corresponding social-networking provider (e.g., FACEBOOK or MYSPACE) of any malicious references (e.g., URLs) contained within the illegitimate content in order to enable the social-networking provider to prevent future attempts to publish content containing the malicious reference. These systems may also instruct a corresponding social-networking provider to prevent future attempts to publish items of content on the social-networking profile from the geographic origin of the illegitimately published item of content.

As will be explained in greater detail below, by validating content published to social-networking profiles by authorized users and devices, the systems and methods described herein may enable security software to easily identify items of content that have been illegitimately published to social-networking profiles. Moreover, by periodically scanning and automatically removing illegitimate content from social-networking profiles, the systems and methods described herein may increase the overall security of such profiles, potentially resulting in increased user and/or consumer confidence.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of an exemplary request to publish content on a social-networking profile and an exemplary database entry containing hashes of valid published content.

Figure 1:
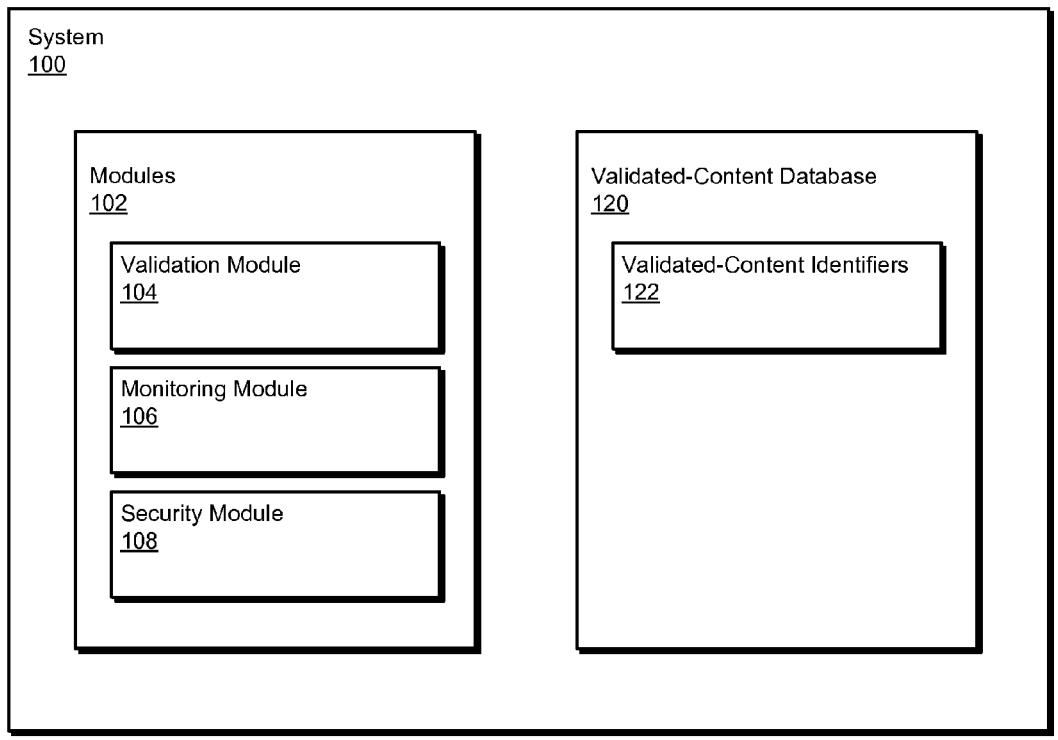
FIG. 1 is a block diagram of an exemplary system for determining whether profiles associated with social-networking websites have been compromised.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for determining whether profiles associated with social-networking websites have been compromised. The phrase "social-networking websites," as used herein, generally refers to any type of website that enables users to interact online. Examples of social-networking websites include, without limitation, FACEBOOK, MYSPACE, TWITTER, LINKEDIN, TAGGED, MYYEARBOOK, MEETUP, MYLIFE, MYHERITAGE, MULTIPLY, ORKUT, NING, CLASSMATES.COM, BEBO, FRIENDSTER, HI5, ORKUT, PERFSPOT, ZORPIA, NETLOG, HABBO, or any other website that facilitates online social networking.

Figure 2:
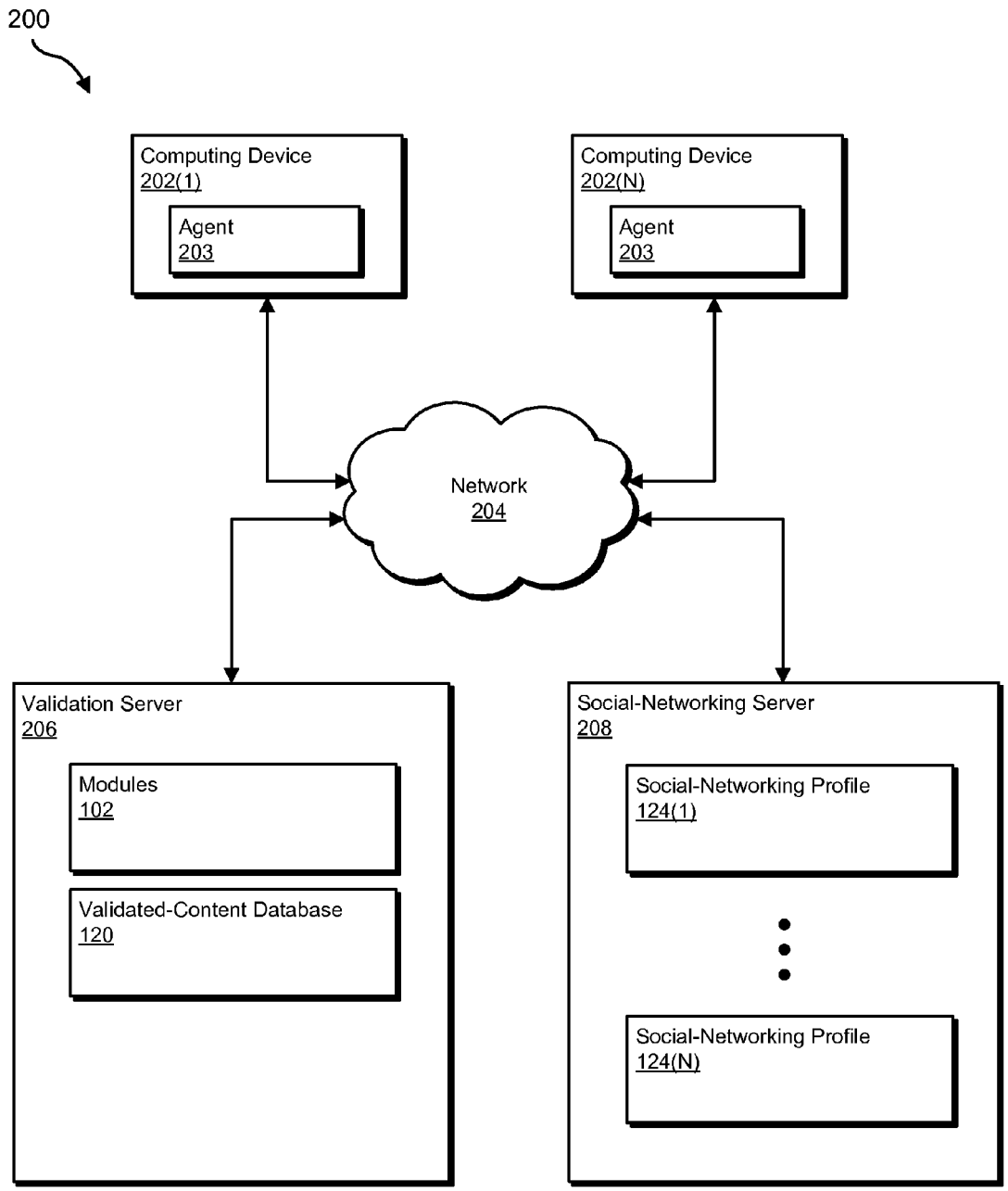
FIG. 2 is a block diagram of an exemplary system for determining whether profiles associated with social-networking websites have been compromised.

The following will provide, with reference to FIGS. 1-2, detailed descriptions of exemplary systems for determining whether profiles associated with social-networking websites have been compromised. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for determining whether profiles associated with social-networking websites have been compromised. As illustrated in this figure, exemplary system 100 may include one or more modules 102 for performing one or more tasks. For example, and as will be explained in greater detail below, exemplary system 100 may include a validation module 104 programmed to create a database of validated-content identifiers that identify valid content published on a social-networking profile. Exemplary system 100 may also include a monitoring module 106 programmed to monitor the social-networking profile to determine whether any content has been illegitimately published on the social-networking profile.

In addition, and as will be described in greater detail below, exemplary system 100 may include a security module 108 programmed to perform at least one security action on the social-networking profile upon determining that at least one item of content was illegitimately published on the social-networking profile. Although illustrated as separate elements, one or more of modules 102 in FIG. 1 may represent portions of a single module or application (e.g., an application that interfaces with social-networking websites).

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing devices 202(1)-(N), validation server 206, and/or social-networking server 208), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as validated-content database 120. In some examples, validated-content database 120 may be configured to store validated-content identifiers 122 that uniquely identify valid content published on at least one social-networking profile.

Validated-content database 120 in FIG. 1 may represent a portion of one or more computing devices. For example, validated-content database 120 may represent a portion of the devices illustrated in FIG. 2 (e.g., computing devices 202(1)-(N), validation server 206, and/or social-networking server 208), computing system 510 in FIG. 5, and/or portions of exemplary network architecture 600 in FIG. 6. Alternatively, validated-content database 120 in FIG. 1 may represent one or more physically separate devices capable of being accessed by a computing device, such as the devices illustrated in FIG. 2 (e.g., computing devices 202(1)-(N), validation server 206, and/or social-networking server 208), computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of exemplary system 200 in FIG. 2. As shown in FIG. 2, system 200 may include a network 204 that facilitates communication among computing devices 202(1)-(N), a validation server 206, and a social-networking server 208. System 200 may also include one or more of modules 102 and/or database 120 located on computing devices 202(1)-(N), validation server 206, and/or social-networking server 208.

In one embodiment, and as will be described in greater detail below, agent(s) 203 and/or validation server 206 may be programmed by one or more of modules 102 to determine whether a social-networking profile (e.g., social-networking profile 124(1)) has been compromised by (1) creating a database (e.g., validated-content database 120) of validated-content identifiers (e.g., validated-content identifiers 122) that uniquely identify valid content published on the social-networking profile, (2) monitoring the social-networking profile to determine whether any content has been illegitimately published on the social-networking profile, and then (3) performing at least one security action on the social-networking profile upon determining that at least one item of content has been illegitimately published on the social-networking profile (by, e.g., removing the illegitimately published content from the social-networking profile).

Computing devices 202(1)-(N) generally represent any type or form of computing device capable of reading computer-executable instructions. Examples of computing devices 202(1)-(N) include, without limitation, laptops, desktops, servers, cellular phones, personal digital assistants (PDAs), multimedia players, embedded systems, combinations of one or more of the same, exemplary computing system 510 in FIG. 5, or any other suitable computing device. In one example, computing devices 202(1)-(N) may include an agent 203 capable of detecting executing one or more of modules 102.

Validation server 206 generally represents any type or form of computing device capable of housing modules 102 and/or validated-content database 120. In some examples, validation server 206 may be configured to proxy online traffic between computing devices 202(1)-(N) and social-networking server 208. Examples of validation server 206 include, without limitation, application servers and database servers configured to provide various database services and/or run certain software applications.

Social-networking server 208 generally represents any type or form of computing device capable of supporting and facilitating access to a social-networking website. Examples of social-networking server 208 include, without limitation, application servers that run certain software applications, database servers that provide various database services, web servers that facilitate access to online content, or any other types of suitable servers.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections.

Figure 3:
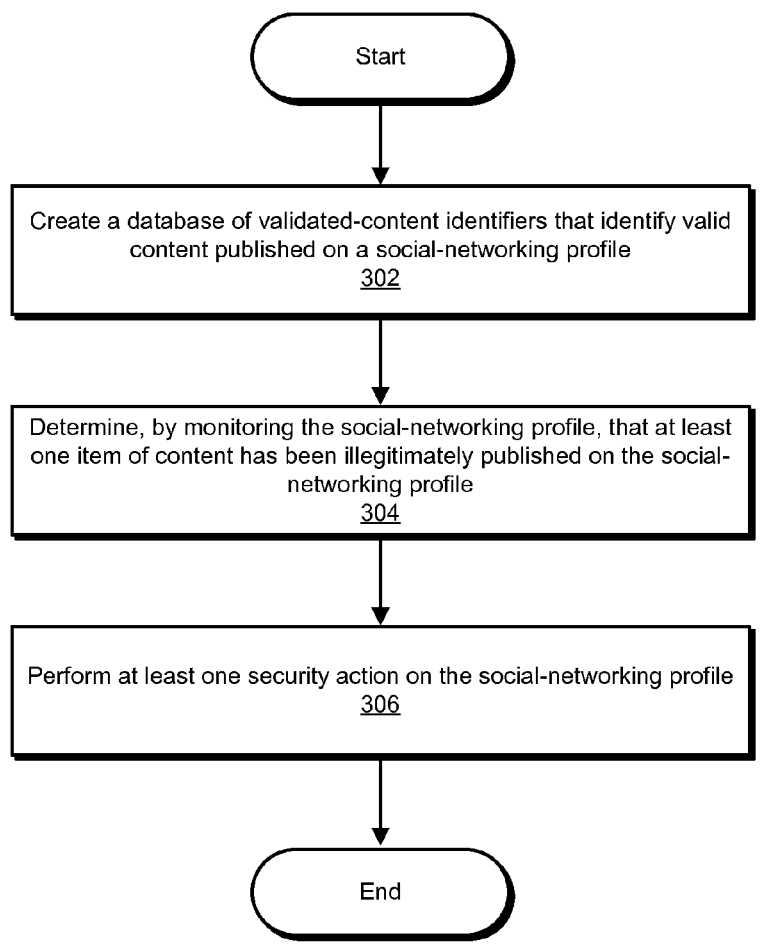
FIG. 3 is a flow diagram of an exemplary method for determining whether profiles associated with social-networking websites have been compromised.

FIG. 3 is a flow diagram of an exemplary computer-implemented method 300 for determining whether profiles associated with social-networking websites have been compromised. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the various systems described herein may create a database of validated-content identifiers that uniquely identify valid content published on at least one social-networking profile (such as a commercial social-networking profile associated with a business). For example, validation module 104 may, as part of validation server 206 and/or agent 203 on computing devices 202(1)-(N) in FIG. 2, create and store validated-content identifiers (e.g., content hashes) within validated-content database 120 for each item of valid content published on social-networking profiles 124(1)-(N).

The systems described herein may perform step 302 in a variety of ways. In one example, the systems described herein may generate the database of validated-content identifiers by (1) identifying requests from authorized client devices to publish content on the social-networking profile in question, (2) generating a validated-content identifier for each item of content published by such authorized client devices, and then (3) storing each such validated-content identifier within a database entry associated with the social-networking profile in question.

For example, validation module 104 may, as part of validation server 206 and/or agent 203 on computing devices 202(1)-(N) in FIG. 2, identify a request from an authorized client device (e.g., computing device 202(1)) to publish content to social-networking profile 124(1) on social-networking server 208. The term "authorized client device," as used herein, may refer to a computing device operated by an authorized user of a social-networking profile (i.e., a user that is authorized to post content to a social-network profile). In some examples (e.g., when validation module 104 operates as part of validation server 206), validation module 104 may verify that a computing device (e.g., computing device 202(1)) represents an "authorized client device" by requiring that the device in question (or a user operating the device in question) complete an authentication process (by, e.g., requiring authentication credentials or the like). In other examples, validation module 104 may verify that a computing device represents an "authorized client device" by verifying that the device in question is associated with the social-networking profile in question.

The systems described herein may identify requests from authorized client devices to publish content on a social-networking profile in a variety of ways. In one example, validation module 104 may monitor for and detect such requests as part of an agent installed on the authorized client devices themselves (e.g., as part of agent 203 installed on computing devices 202(1)-(N) in FIG. 2). For example, validation module 104 may, as part of agent 203 installed on computing device 202(1) in FIG. 2, simply monitor and log content published to social-networking profile 124(1) by computing device 202(1) (by, e.g., monitoring and logging traffic directed to social-networking server 208).

In another example, validation module 104 may receive such requests from authorized client devices as part of a validation server. For example, validation module 104 may, as part of validation server 206 in FIG. 2, receive requests to publish content on social-networking profile 124(1) from agents 203 installed on computing devices 202(1)-(N). In this example, validation server 206 may act as a proxy server between computing devices 202(1)-(N) and social-networking server 208, effectively proxying the online traffic required to complete each publication request.

Publication request 400 in FIG. 4 is an example of a publication request that validation module 104 may receive at validation server 206 from an authorized client device (e.g., computing device 202(1)). As seen in this figure, publication request 400 may include information that identifies the target social-networking provider (in this example, "http://www.facebook.com"), the target social-networking profile (in this example, "http://www.facebook.com/megashoe"), the content to be published on the social-networking profile (in this example, "'Check out MegaShoe's newest shoe models at http://www.megashoe.com/newreleases'"), and a timestamp that identifies the date and time that request 400 was initiated (in this example, "2-1-2011 T 10:45 UTC"). Examples of the types of content that may be included in such requests include, without limitation, text, images, photographs, video, audio, references (such as links to other websites), uniform resource locators, or any other type or form of content capable of being posted on or published to a social-networking profile.

As detailed above, the systems described herein may, upon identifying a request from an authorized client device to publish content on the social-networking profile in question, generate a validated-content identifier for the content in question. For example, validation module 104 may, as part of as part of validation server 206 and/or agent 203 in FIG. 2, generate a validated-content identifier for the content contained within publication request 400 in FIG. 4 (in this example, "'Check out MegaShoe's newest shoe models at http://www.megashoe.com/newreleases'") by generating a hash of the same. The term "validated-content identifier," as used herein, may refer to any type or form of object that uniquely identifies content that may be posted to a social-networking profile. Examples of validated-content identifiers include, without limitation, hashes, fingerprints, checksums, MD5 checksums, secure hash algorithms, or any other suitable identifiers capable of identifying content.

As detailed above, the systems described herein may then store each validated-content identifier generated in this manner within a database entry associated with the social-networking profile in question. For example, validation module 104 may create a database entry within validated-content database 120 for the social-networking profile in question that contains validated-content identifiers (e.g., content hashes) for each item of validated content that has been published on the social-networking profile by an authorized device. Database entry 402 in FIG. 4 is an example of such an entry. As illustrated in this figure, database entry 402 may contain hashes of each item of validated content that has been published on social-networking profile 124(1) by an authorized device (e.g., hashes "0xA2F1B921", "0x1738F12A", "0xD128B379", and "0xEF9A0349").

Returning to FIG. 3, at step 304 one or more of the various systems described herein may determine, by monitoring the social-networking profile, that at least one item of content has been illegitimately published on the social-networking profile. For example, monitoring module 106 may, as part of validation server 206 in FIG. 2, determine, by monitoring social-networking profile 124(1), that at least one item of content has been illegitimately published on social-networking profile 124(1).

The phrase "illegitimately published," as used herein, generally refers to the act of publishing an item of content on a social-networking profile without having received authorization from the owner to publish such content on the social-networking profile. In one example, an item of content may be considered illegitimately published if the creator of the item of content published on the social-networking profile appears to be, but is not actually, the profile owner.

The systems described herein may perform step 304 in a variety of ways. In one example, the systems described herein may perform step 304 by (1) identifying at least one content that has been published on the social-networking profile and then (2) determining that a validated-content identifier for the item of content in question does not exist within the database of validated-content identifiers (which, as will be explained below, may indicate that the item of content has not been validated, and thus represents an illegitimately published item of content).

The systems described herein may identify content that has been published to the social-networking profile in a variety of ways. For example, monitoring module 106 may, as part of validation server 206 and/or agent 203 in FIG. 2, identify content that has been posted to social-networking profile 124(1) using various screen-scraping, web-scraping, and/or data-mining techniques.

Upon identifying an item of content published on the social-networking profile, monitoring module 106 may determine whether a corresponding validated-content identifier (e.g., content hash) for the item of content exists within validated-content database 120. In one example, monitoring module 106 may perform such a determination by (1) generating a hash of the item of content, (2) comparing the hash of the item of content with the hashes stored within the validated-content database, and then (3) determining, based on the comparison, that the hash of the item of content does not correspond to any of the hashes stored in the validated-content database For example, monitoring module 106 may determine, by comparing the hash of an item of content published on social-networking profile 124(1) with the content hashes stored within database entry 402 in FIG. 4, that the hash of the item of content in question does not match any of the content hashes stored within database entry 402. In this example, monitoring module 106 may determine that the item of content in question was illegitimately published to social-networking profile 124(1) since the content was never validated.

In some examples, monitoring module 106 may monitor the social-networking profile by periodically scanning (based, e.g., on configuration delta timers) the social-networking profile for content published to the same. In at least one example, monitoring module 106 may scan content that was published within a predetermined period of time more frequently than other content that was published prior to the predetermined period of time. For example, monitoring module 106 may scan content that was published to the social-networking profile within the last hour at 5-minute intervals but scan content that was published more than an hour ago at 30-minute intervals.

Returning to FIG. 3, at step 306 one or more of the various systems described herein may, upon determining that at least one item of content was illegitimately published on the social-networking profile, perform at least one security action on the social-networking profile. For example, security module 108 may, as part of validation server 206 in FIG. 2, perform at least one security action on social-networking profile 124(1) upon determining that the item of content identified in step 304 was illegitimately published on social-networking profile 124(1).

The systems described herein may perform step 306 in a variety of ways. In some examples, security module 108 may remove the illegitimately published item of content from the social-networking profile. In this example, users that visit the social-networking profile may no longer be able to access the content in question.

In other examples, security module 108 may reset at least a portion of the login information associated with the social-networking profile. For example, security module 108 may reset the profile owner's password in an attempt to prevent further unauthorized access to the owner's social-networking profile. In this example, security module 108 may require the profile owner to obtain the reset password from an authorized client device (such as computing devices 202(1)-(N)) on which an agent capable of authenticating the profile owner's identity has been installed. In additional examples, security module 108 may also notify the owner of the social-networking profile of the illegitimately published item of content.

In one example, monitoring module 106 may identify a malicious reference (such as a link to a malicious website) within the illegitimately published item of content. For example, monitoring module 106 may identify a link to "http://www.maliciouswebsite.com" included within the illegitimately published item of content identified in step 304. In this example, monitoring module 106 may notify social-networking server 208 of the malicious URL to enable a social-networking provider associated with social-networking server 208 to prevent future attempts to publish another item of content that includes the malicious URL.

In another example, monitoring module 106 may determine, by comparing the geographic origin of the illegitimately published item of content with the geographic origins of all valid items of content published on the social-networking profile, that the geographic origin of the illegitimately published item of content differs from the geographic origins of all valid content published on the social-networking profile. In this example, monitoring module 106 may, upon making such a determination, instruct a social-networking provider associated with the social-networking provider to prevent future attempts to publish items of content to the social-networking profile that originate from the geographic origin associated with the illegitimately published item of content.

For example, monitoring module 106 may obtain information (e.g., an IP address or GPS coordinates) that identifies the geographic origin of the illegitimately published item of content identified in step 304. In this example, monitoring module 106 may obtain such information from an activity log maintained by a social-networking provider associated with the social-networking profile.

In this example, monitoring module 106 may determine that the geographic origin of the illegitimately published item of content is different from the geographic origin of each valid item of content identified within database entry 402 in FIG. 4. Monitoring module 106 may then instruct a social-networking provider associated with social-networking profile 124(1) to prevent future attempts to publish items of content on social-networking profile 124(1) that originate from the geographic origin of the illegitimately published item of content.

As explained in greater detail above, by validating content published to social-networking profiles by authorized users and devices, the systems and methods described herein may enable security software to easily identify items of content that have been illegitimately published to social-networking profiles. Moreover, by periodically scanning and automatically removing illegitimate content from social-networking profiles, the systems and methods described herein may increase the overall security of such profiles, potentially resulting in increased consumer confidence.

Figure 5:
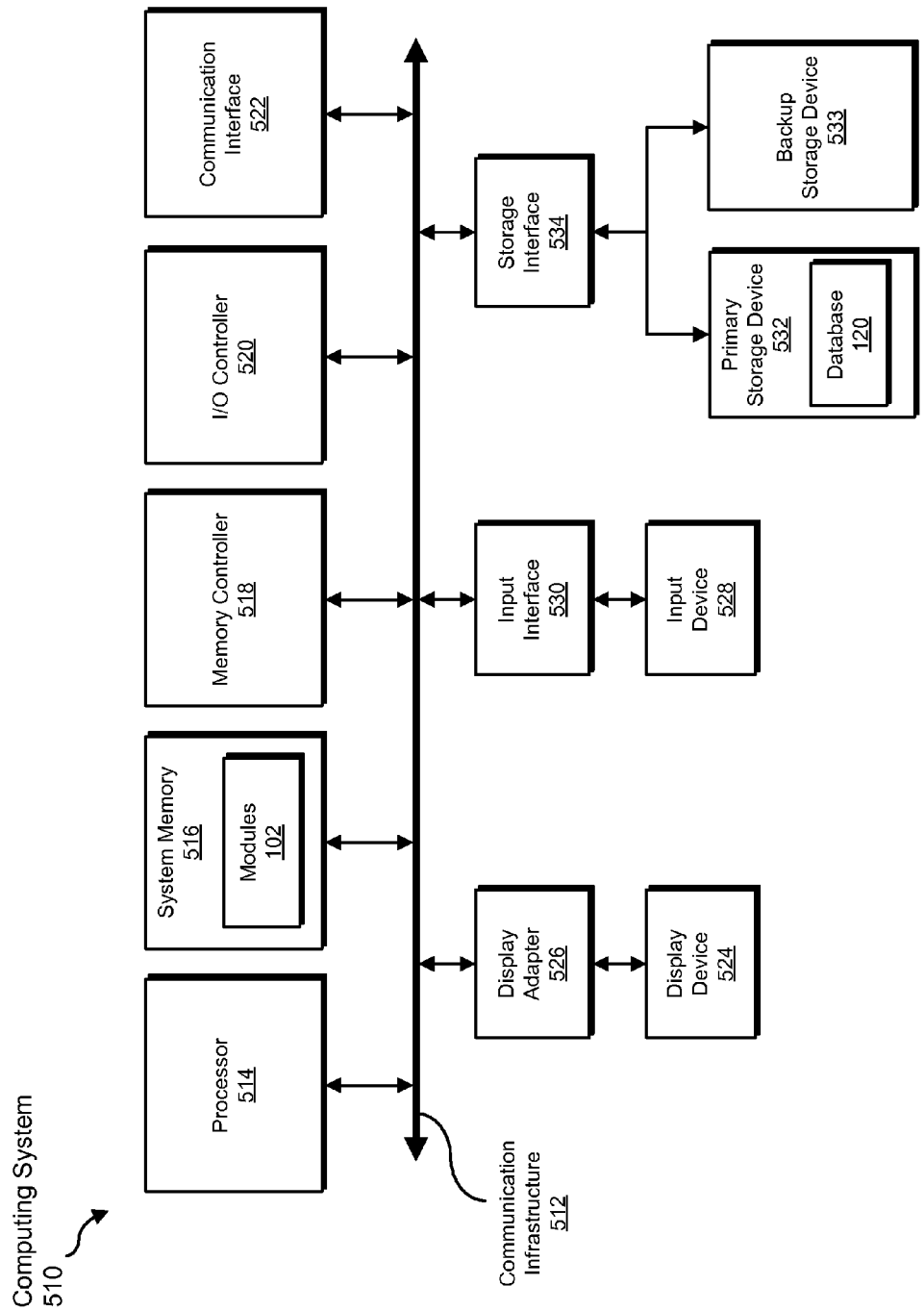
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the creating, receiving, generating, storing, publishing, monitoring, identifying, determining, performing, generating, comparing, scanning, instructing, logging into, notifying, removing, and resetting steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as creating, receiving, generating, storing, publishing, monitoring, identifying, determining, performing, generating, comparing, scanning, instructing, logging into, notifying, removing, and resetting.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the creating, receiving, generating, storing, publishing, monitoring, identifying, determining, performing, generating, comparing, scanning, instructing, logging into, notifying, removing, and resetting steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the creating, receiving, generating, storing, publishing, monitoring, identifying, determining, performing, generating, comparing, scanning, instructing, logging into, notifying, removing, and resetting steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the creating, receiving, generating, storing, publishing, monitoring, identifying, determining, performing, generating, comparing, scanning, instructing, logging into, notifying, removing, and resetting steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the creating, receiving, generating, storing, publishing, monitoring, identifying, determining, performing, generating, comparing, scanning, instructing, logging into, notifying, removing, and resetting steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
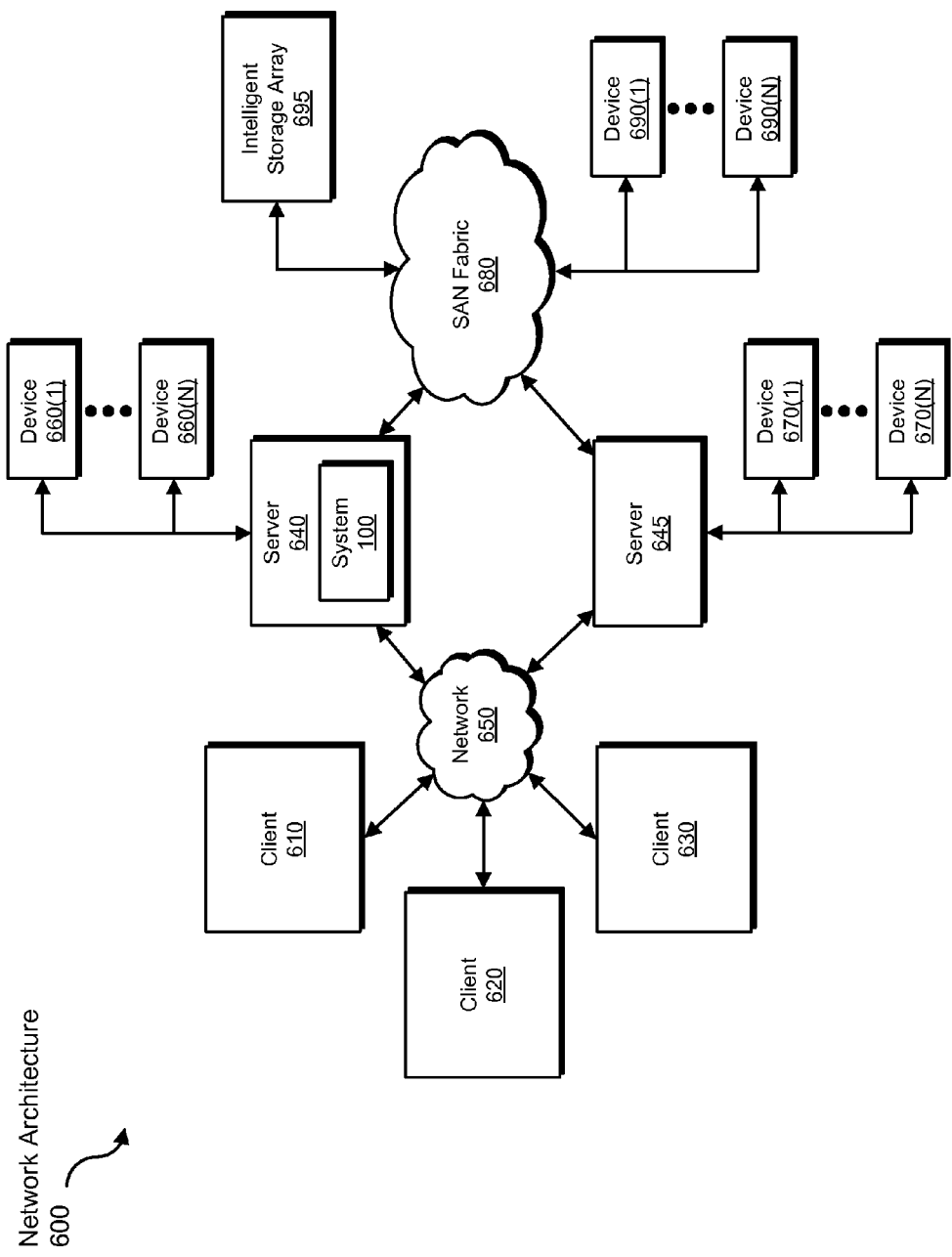
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the creating, receiving, generating, storing, publishing, monitoring, identifying, determining, performing, generating, comparing, scanning, instructing, logging into, notifying, removing, and resetting steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for determining whether profiles associated with social-networking websites have been compromised that includes (1) creating a database of validated-content identifiers) that identify valid content published on a social-networking profile by, for each item of valid content published on the social-networking profile, (a) identifying a request from an authorized client device to publish the valid content on the social-networking profile, (b) generating a validated-content identifier that uniquely identifies the valid content, and then (c) storing the validated-content identifier in the database of validated-content identifiers, (2) determining, by monitoring the social-networking profile, that at least one item of content has been illegitimately published on the social-networking profile by (a) identifying at least one item of content that has been published on the social-networking profile and (b) determining that a validated-content identifier for the item of content does not exist within the database of validated-content identifiers, and then, in response to determining that at least one item of content has been illegitimately published on the social-networking profile, (3) performing at least one security action on the social-networking profile.

In some examples, identifying the request from the authorized client device may include authenticating the authorized client device. Identifying the request from the authorized client device may also include receiving the request from an agent installed on the authorized client device. The computing device may include the authorized client device and/or a validation server.

In one example, the validated-content identifiers may include hashes of the valid content published on the social-networking profile. In this example, determining that a validated-content identifier for the item of content does not exist within the database of validated-content identifiers may include (1) generating a hash of the item of content, (2) comparing the hash of the item of content with the hashes stored in the database, and then (3) determining, based on the comparison, that the hash of the item of content does not correspond to any of the hashes stored in the database.

In some embodiments, monitoring the social-networking profile may include periodically scanning content published on the social-networking profile. In these embodiments, periodically scanning content published on the social-networking profile may include scanning content that was published within a predetermined period of time more frequently than other content that was published prior to the predetermined period of time.

In one example, performing the security action on the social-networking profile may include (1) identifying a malicious reference within the illegitimately published item of content and then (2) notifying a social-networking provider of the malicious reference to enable the social-networking provider to prevent future attempts to illegitimately publish another item of content that comprises the malicious reference. Performing the security action on the social-networking profile may also include (1) identifying a geographic origin of the illegitimately published item of content, (2) identifying at least one geographic origin of the valid content published on the social-networking profile, (3) determining that the illegitimately published item of content's geographic origin is different from the valid content's geographic origin, and then (4) instructing a social-networking provider to prevent future attempts to publish items of content on the social-networking profile from the geographic origin of the illegitimately published item of content. Performing the security action on the social-networking profile may also include removing the illegitimately published item of content from the social-networking profile, resetting login information associated with the social-networking profile, and/or notifying an owner of the social-networking profile of the illegitimately published item of content.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of modules 102 in FIG. 1 may transform a characteristic or property of a physical device (such as social-networking server 208 in FIG. 2) by performing a security action that modifies at least one setting associated with a social-networking profile or at least one item of content published on a social-networking profile.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for determining whether profiles associated with social-networking websites have been compromised, at least a portion of the method being performed by a computing device comprising at least one processor, the method comprising:
    creating a database of validated-content identifiers that identify valid content published on a social-networking profile associated with a social-networking website by:
        identifying a plurality of requests to publish the valid content on the social-networking profile;
        determining that the plurality of requests to publish the valid content on the social-networking website originated from at least one authorized client device;
        generating, due at least in part to the plurality of requests having originated from the authorized client device, a plurality of validated-content identifiers that uniquely identify the valid content;
        storing the plurality of validated-content identifiers in the database of validated-content identifiers;
    determining, by monitoring the social-networking profile, that at least one item of content has been illegitimately published on the social-networking profile by:
        identifying at least one item of content that has been published on the social-networking profile;
        determining that a validated-content identifier for the item of content does not exist within the database of validated-content identifiers;
    in response to determining that the item of content has been illegitimately published on the social-networking profile, performing at least one security action on the social-networking profile by:
        identifying a geographic origin of the illegitimately published item of content;
        identifying geographic origins of all of the valid content published on the social-networking profile;
        determining that the illegitimately published item of content's geographic origin is different from the geographic origins of all of the valid content;
        instructing a social-networking provider to prevent future attempts to publish items of content on the social-networking profile from the geographic origin of the illegitimately published item of content.

2. The computer-implemented method of claim 1, wherein identifying the plurality of requests from the authorized client device comprises authenticating the authorized client device.

3. The computer-implemented method of claim 1, wherein identifying the plurality of requests from the authorized client device comprises receiving the plurality of requests from at least one agent installed on the authorized client device.

4. The computer-implemented method of claim 1, wherein the plurality of validated-content identifiers comprise hashes of the valid content published on the social-networking profile.

5. The computer-implemented method of claim 4, wherein determining that a validated-content identifier for the item of content does not exist within the database of validated-content identifiers comprises:
   generating a hash of the item of content;
   comparing the hash of the item of content with the hashes stored in the database;
   determining, based on the comparison, that the hash of the item of content does not correspond to any of the hashes stored in the database.

6. The computer-implemented method of claim 1, wherein monitoring the social-networking profile comprises periodically scanning content published on the social-networking profile.

7. The computer-implemented method of claim 6, wherein periodically scanning content published on the social-networking profile comprises scanning content that was published within a predetermined period of time more frequently than other content that was published prior to the predetermined period of time.

8. The computer-implemented method of claim 1, wherein performing the security action on the social-networking profile further comprises:
   identifying a malicious reference within the illegitimately published item of content;
   notifying a social-networking provider of the malicious reference to enable the social-networking provider to prevent future attempts to illegitimately publish another item of content that comprises the malicious reference.

9. The computer-implemented method of claim 1, wherein performing the security action on the social-networking profile further comprises at least one of:
   removing the illegitimately published item of content from the social-networking profile;
   resetting login information associated with the social-networking profile;
   notifying an owner of the social-networking profile of the illegitimately published item of content.

10. The computer-implemented method of claim 1, wherein the computing device comprises at least one of:
   the authorized client device;
   a validation server.

11. A system for determining whether profiles associated with social-networking websites have been compromised, the system comprising:
   a validation module programmed to create a database of validated-content identifiers that identify valid content published on a social-networking profile associated with a social-networking website by:
      identifying a plurality of requests to publish the valid content on the social-networking profile;
      determining that the plurality of requests to publish the valid content on the social-networking website originated from at least one authorized client device;
      generating, due at least in part to the plurality of requests having originated from the authorized client device, a plurality of validated-content identifiers that uniquely identify the valid content;
      storing the plurality of validated-content identifiers in the database of validated-content identifiers;
   a monitoring module programmed to determine, by monitoring the social-networking profile, that at least one item of content has been illegitimately published on the social-networking profile by:
      identifying at least one item of content that has been published on the social-networking profile;
      determining that a validated-content identifier for the item of content does not exist within the database of validated-content identifiers;
   a security module programmed to perform at least one security action on the social-networking profile in response to the determination that the item of content has been illegitimately published on the social-networking profile by:
      identifying a geographic origin of the illegitimately published item of content;
      identifying geographic origins of all of the valid content published on the social-networking profile;
      determining that the illegitimately published item of content's geographic origin is different from the geographic origins of all of the valid content;
      instructing a social-networking provider to prevent future attempts to publish items of content on the social-networking profile from the geographic origin of the illegitimately published item of content;
   at least one hardware processor configured to execute the validation module, the monitoring module, and the security module.

12. The system of claim 11, wherein the validation module is further programmed to authenticate the authorized client device.

13. The system of claim 11, wherein the validation module identifies the plurality of requests from the authorized client device by receiving the plurality of requests from an agent installed on the authorized client device.

14. The system of claim 11, wherein the validated-content identifiers comprise hashes of the valid content published on the social-networking profile.

15. The system of claim 14, wherein the monitoring module determines that a validated-content identifier for the item of content does not exist within the database of validated-content identifiers by:
   generating a hash of the item of content;
   comparing the hash of the item of content with the hashes stored in the database;
   determining, based on the comparison, that the hash of the item of content does not correspond to any of the hashes stored in the database.

16. The system of claim 11, wherein the monitoring module monitors the social-networking profile by periodically scanning content published on the social-networking profile.

17. The system of claim 11, wherein the security module performs the security action on the social-networking profile by further:
   identifying a malicious reference within the illegitimately published item of content;
   notifying a social-networking provider of the malicious reference to enable the social-networking provider to prevent future attempts to illegitimately publish another item of content that comprises the malicious reference.

18. The system of claim 11, wherein the security module performs the security action on the social-networking profile by further at least one of:
   removing the illegitimately published item of content from the social-networking profile;
   resetting login information associated with the social-networking profile;
   notifying an owner of the social-networking profile of the illegitimately published item of content.

19. A non-transitory computer-readable-storage medium comprising one or more computer-executable instructions that, when executed by at least one processor of a computing device, cause the computing device to:

create a database of validated-content identifiers that identify valid content published on a social-networking profile associated with a social-networking website by:

identifying a plurality of requests to publish the valid content on the social-networking profile;

determining that the plurality of requests to publish the valid content on the social-networking website originated from at least one authorized client device;

generating, due at least in part to the plurality of requests having originated from the authorized client device, a plurality of validated-content identifiers that uniquely identify the valid content;

storing the plurality of validated-content identifiers in the database of validated-content identifiers;

determine, by monitoring the social-networking profile, that at least one item of content has been illegitimately published on the social-networking profile by:

identifying at least one item of content that has been published on the social-networking profile;

determining that a validated-content identifier for the item of content does not exist within the database of validated-content identifiers;

perform at least one security action on the social-networking profile in response to the determination that the item of content has been illegitimately published on the social-networking profile by:

identifying a geographic origin of the illegitimately published item of content;

identifying geographic origins of all of the valid content published on the social-networking profile;

determining that the illegitimately published item of content's geographic origin is different from the geographic origins of all of the valid content;

instructing a social-networking provider to prevent future attempts to publish items of content on the social-networking profile from the geographic origin of the illegitimately published item of content.

\* \* \* \* \*